United States Patent [19]

Laue

[11] Patent Number: 4,901,426

[45] Date of Patent: Feb. 20, 1990

[54] METHOD OF MAKING A PEDAL ROD

[76] Inventor: Charles E. Laue, 1041 Pawnee Rd., Wilmette, Ill. 60091

[21] Appl. No.: 312,464

[22] Filed: Feb. 21, 1989

[51] Int. Cl.$^4$ .................. B21D 39/00; B23P 11/00
[52] U.S. Cl. ............................ 29/510; 29/517; 29/525; 74/512; 403/343
[58] Field of Search .............. 29/437, 516, 517, 510, 29/525; 74/512, 560, 561; 403/343

[56] References Cited

U.S. PATENT DOCUMENTS

| | | | |
|---|---|---|---|
| 856,316 | 6/1907 | Thurston | 29/437 UX |
| 2,497,384 | 2/1950 | Young | 403/343 X |
| 2,596,885 | 5/1952 | Booth | 403/343 |
| 2,869,392 | 1/1959 | Muller | 74/512 |
| 2,881,738 | 4/1959 | Baker | 403/343 X |
| 2,884,803 | 5/1959 | Willis | 74/512 |
| 2,900,203 | 8/1959 | Hayden | 29/437 UX |
| 4,500,224 | 2/1985 | Ewing | 403/343 |
| 4,538,339 | 9/1985 | Ewing | 29/517 X |

Primary Examiner—Charlie T. Moon
Attorney, Agent, or Firm—Walter L. Schlegel, Jr.

[57] ABSTRACT

A method of fabricating a brake pedal rod comprising the steps of forming an end-piece from a readily machinable material having an aperture forming means for attachment to a brake pedal. A shank piece is formed of materials preferably having greater strength under compressive load than the end-piece, and then a flat end of the shank piece is attached to the end-piece to form a pedal rod, said end having spaced arcuate surfaces in threaded engagement with the end-piece preferably along interference threads capable of resisting unthreading forces of the order of 5-40 inch pounds or more.

7 Claims, 2 Drawing Sheets

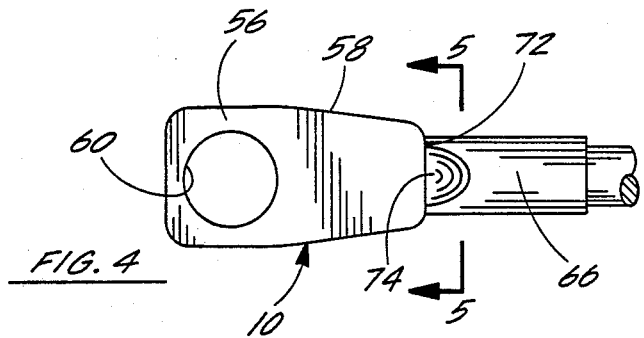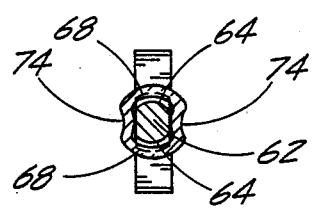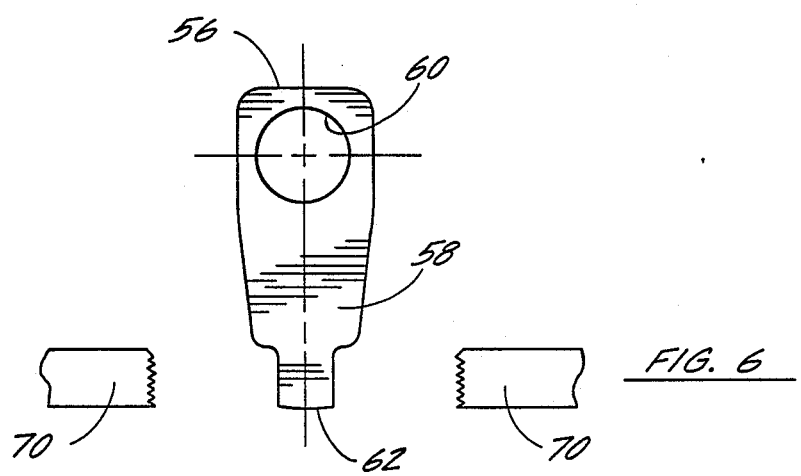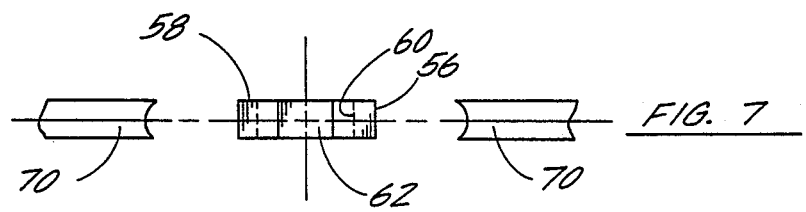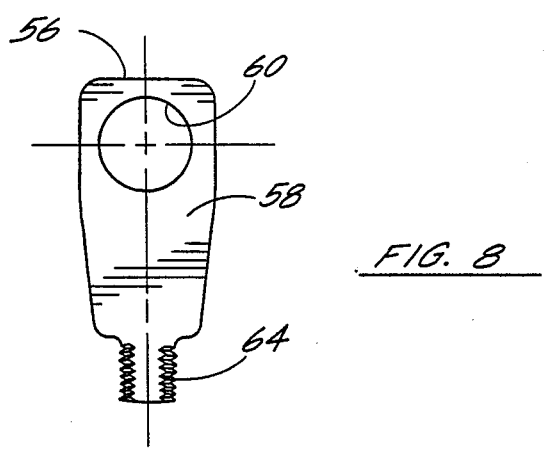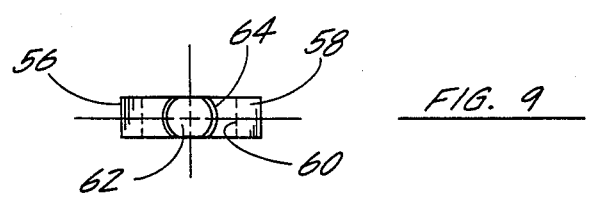

METHOD OF MAKING A PEDAL ROD

This invention relates to brakes for automotive vehicles and more particularly to such a brake wherein an annular resiliant diaphram is clamped around its outer perimeter by a pair of annular housing or shell members defining spaced vacuum chambers at opposite sides of the diaphram. The diaphram has a central opening tightly clamping an annular valve body in an air-tight snap fit within an annular groove thereof. The valve body is urged into one of the vacuum chambers in response to pressure of an operator's foot on a brake pedal urging a pedal rod into the valve body and thereby urging the valve body against a compression rod assembly which in turn actuates the piston of a conventional master cylinder containing liquid which actuates the pistons of the wheel brakes.

As the pedal rod is urged into the valve body, atmospheric pressure is admitted to one of the chambers while the other chamber containing the compression rod assembly is under vacuum. This causes atmospheric pressure to apply the wheel brakes in response to very slight pressure on the brake pedal.

The present invention relates to the pedal rod which according to prior art practices consisted of a solid steel rod formed of forged and machined steel. A primary object of the invention is to form the end-piece of the pedal rod which is attached to the brake pedal of a different metal than the remainder of the pedal rod which transmits compression to the valve body under load of the order of 3,000 pounds or more during panic braking whereas release spring pressure to put the rod under tension upon release of the brake pedal would not exceed a much lower value. For this reason the rod need not be as strong in tension as in compression, although the illustrated form of my pedal rod is equally strong in compression and tension and will test safely in tension at 3,000 pounds.

The foregoing and other objects of the invention will become apparent from a consideration of the following specification and the accompanying drawings, wherein:

FIG. 4 is a fragmentary side elevational view of the pedal rod shown in FIG. 2 after crimping of the shaft piece;

FIG. 5 is a sectional view taken on line 5—5 of FIG. 4;

FIG. 6 is a schematic top plan view of the end-piece and the dies which form the threads thereon;

FIG. 7 is a view taken from the bottom of FIG. 6;

FIG. 8 is a top plan view of the end-piece with the threads thereon; and

FIG. 9 is a view taken from the bottom of FIG. 8.

Figure 1:
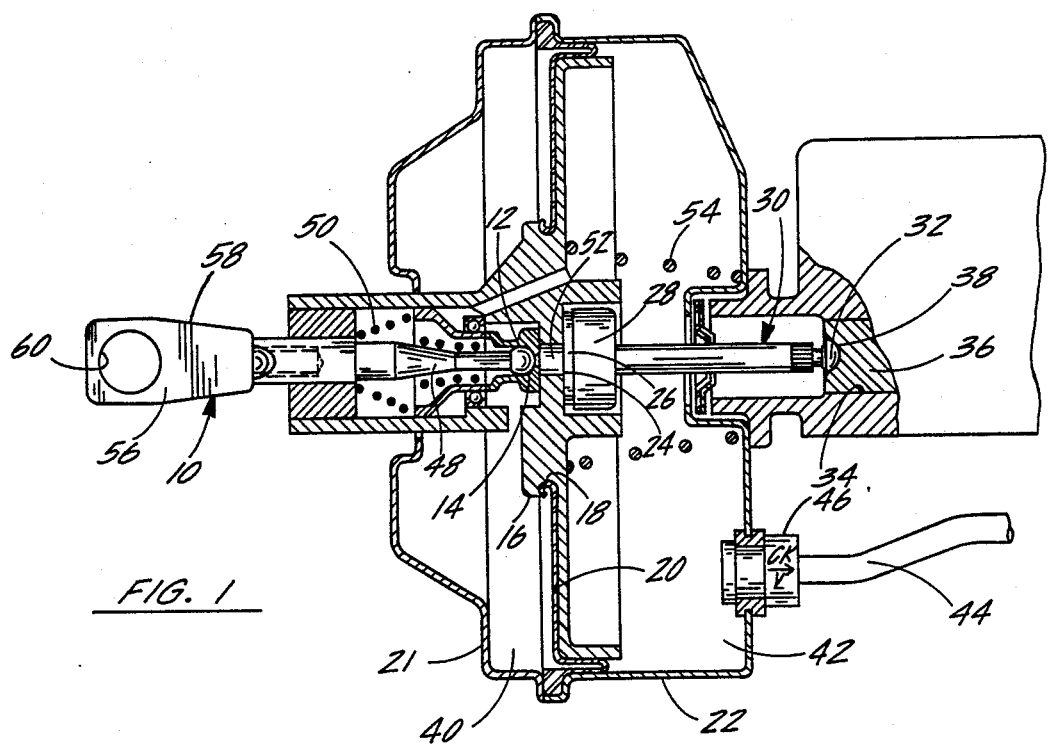
FIG. 1 is a schematic axial sectional view, partly in elevation, of a power brake unit comprising an embodiment of the pedal rod made according to the invention.
Figure 2:
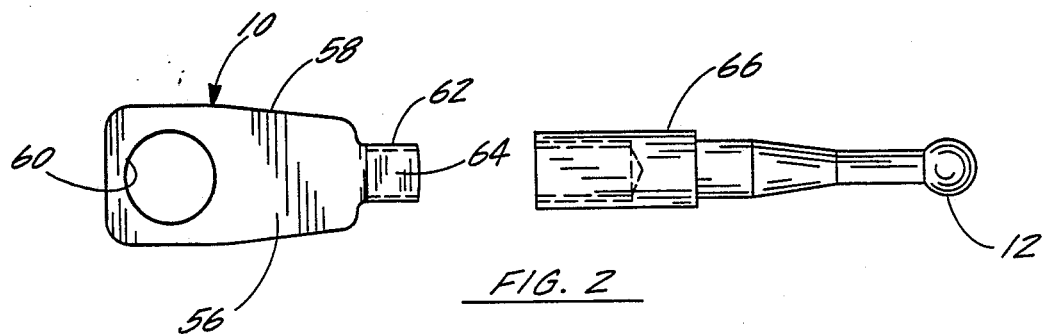
FIG. 2 is an exploded side elevational view of said embodiment of the pedal rod before crimping of the shaft piece to the end-piece.

Describing the invention in detail and referring first to FIG. 1, the power brake unit is conventional except for the pedal rod generally designated 10 (hereinafter described in detail), the button end 12 of which is received in a complementary, cylindrical recess or socket 14 of an annular valve body 16 which has an annular recess or groove 18 having an air-tight snap fit with the inner diameter of an annular resilient diaphram 20, the outer diameter of which is clamped by a pair of annular shell or housing members 21 and 22.

The valve body 16 comprises a seat 24 for a rubber pad 26 engaged by a large end 28 of a compression rod assembly 30 which has a smaller plunger end 32 received within a conventional master brake cylinder 34 removeably attached to the shell 22. The plunger end 32 of the compression rod assembly tightly engages the master cylinder piston 36 at 38 for actuation thereof as hereinafter described.

The diaphram 20 defines spaced vacuum chambers 40 and 42 within the shells 21 and 22, respectively, both of said chambers being connected in the usual manner to intake manifold (not shown) of the vehicle's internal combustion engine through a hose 44 and check valve 46.

When pressure is applied by the operator to the brake pedal, the pedal rod 10 is urged into a conventional valve 48 against resistance of a compression release spring 50 reacting against the valve body 16. This movement of rod 10 causes conventional valve 48 to cut off communication between chambers 40 and 42 and to admit atmospheric pressure to chamber 40 causing the valve body 16 and diaphram 18 to exert that pressure against the compression rod assembly 30 which in turn actuates the piston 36 of the master cylinder.

When the engine (not shown) of the automotive vehicle (not shown) is running, air is drawn through hose 44 and check valve 46. This creates a vacuum in both chambers 40 and 42. When pedal rod 10 is urged into chamber 40 by depression of a brake pedal (not shown) chamber 42 remains under vacuum but atmospheric pressure is admitted to chamber 40 by valve 48 thus exerting atmospheric pressure against the diaphram 20 which moves into chamber 42 along with valve body 16. Inasmuch as atmospheric pressure is of the order of 14 pounds per square inch at sea level, with a ten inch diameter diaphram 18 the braking pressure amounts to the order of 1,000 pounds inch by the application of 10–18 pounds per square inch to the brake pedal.

As this actuation occurs, the rubber of disc 26 flows into a hole 52 of a wall of the valve body 16 at the inner end of its socket 14. This is very important in that the braking force is caused to be proportionate to the pressure of the operator's foot on the brake pedal, thus giving the operator a sense of "feel" that would be lacking if such flowing of the rubber of disc 26 did not occur.

Upon release of pedal rod 10 the valve 48 closes, cutting off atmospheric pressure from chamber 28 and reconnecting it to chamber 30 so that chamber 28 is again under vacuum, whereupon the resiliency of the diaphram 20 and a return spring 54 in chamber 42 returns the parts to non-brake position shown in FIG. 1.

The pedal rod 10 (FIG. 1) comprises an end-piece 56 which is formed of a free machining material such as punch-press steel stamped into the form of a flat strap 58 with an aperture or eye 60 therethrough adapted for connection to an associated brake pedal (not shown). The end-piece 56 also comprises flat lug or trunnion 62 having spaced curved surfaces 64 in threaded engagement with a shaft piece 66 at 68. Preferably the threaded engagement at 68 is along interference threads. FIGS. 6–9 show the manner of threading lug 62 by a pair of split dies 70 which simultaneously engage the curved surfaces 64 (FIG. 5) to impress the threads thereon at 64 without any rotation of the lug 62 or the dies 70.

FIGS. 6 and 7 show the dies spaced from the lug 62. The dies 70 engage the lug 62 at the same time to form the threads thereon at 64 (FIGS. 8 and 9). By moving one die 70 relative to the other vertically as seen in FIGS. 6 and 7 the interference threads are capable of resisting unthreading forces of the order of 5–40 inch pounds or more.

I can accomplish any torque range in assembly by moving one part of "split die" out of position either forward or backward. This slight maladjustment of the two halves develops a variable torque depending on the amount of adjustment.

I also can move ¼ of the split die to accomplish a uniform friction or drag on thread to maintain a uniform torque in both in and out directions.

Figure 3:
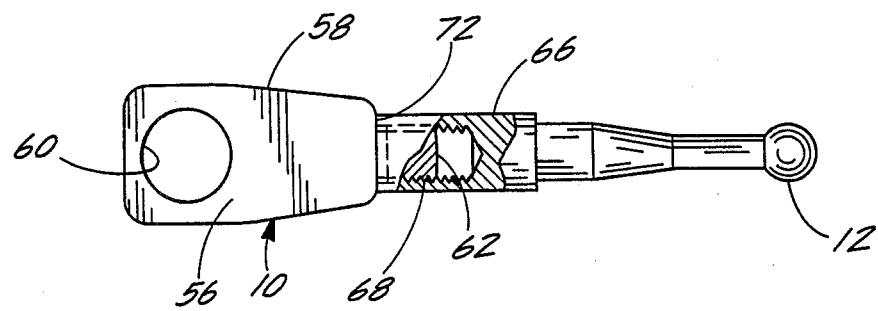
FIG. 3 is a side elevational view of the pedal rod shown in FIG. 2 partly broken away.

When the threads 64 have been formed the end-piece 56 is threaded into the shaft piece at 68 (FIG. 3) with a sufficient force to seat the shaft piece at 72 (FIGS. 3 and 4) against the end-piece. As an extra precaution against accidental unthreading at 68, the shaft piece may be crimped as at 74 against the flat surfaces of the lug 62 as best seen in FIGS. 4 and 5.

It will be understood that it is necessary to keep the shaft piece and the end-piece coupled for safety reasons. Also it is an important feature of the invention to accommodate end-pieces of various changes in design particularly with respect to the location of eye 60 to avoid the prior practice of maintaining a separate set of forging dies to accommodate each such change.

What is claimed is:

1. A method of fabricating a brake pedal rod comprising the steps of forming an end-piece from a light weight, readily machinable flat material having an aperture in one end thereof for attachment to a brake pedal, forming a shank piece with an internally threaded hollow end portion of material having greater strength under compressive load than the end-piece, and then attaching a flat other end of the end-piece to the shank piece hollow end to form a pedal rod by threading said flat other end having spaced arcuate threaded edge surfaces into threaded engagement with the internal threads of the hollow end of the shank piece along interference threads capable of resisting unthreading forces of the order of at least 5–40 inch pounds or more.

2. A method according to claim 1 wherein the shank piece hollow end is formed to engage said flat other end of said end-piece between said spaced surfaces.

3. A method according to claim 2 wherein the shank piece hollow end portion which engages said other end is formed by crimping said shank piece after it has been threaded on said spaced surfaces.

4. A method according to claim 1 wherein one piece is formed to define a lip of metal snugly overlapping the other piece to prevent rotative motion of the pieces relative to each other about the axis of the threads.

5. A method of fabricating a brake pedal rod comprising the steps of forming an end-piece from a readily machinable flat material, forming a shaft piece with an internally threaded hollow end portion of readily machinable material, and then preparing a connection between the end-piece having a flat end with spaced arcuate threaded edge surfaces by threading same into engagement with said internally threaded hollow end portion of the shaft piece, and forming said shaft piece with flattened spaced surfaces separated by spaced curved surfaces in threaded engagement with said spaced arcuate threaded edges of said end-piece.

6. A method according to claim 5 wherein said spaced arcuate surfaces of the shaft piece engage the end-piece along interference threads.

7. A method according to claim 5 wherein the end-piece and the shaft piece are both formed of steel.

* * * * *